United States Patent
Yamaki

(10) Patent No.: US 7,780,388 B2
(45) Date of Patent: Aug. 24, 2010

(54) TAPPING SCREW

(75) Inventor: Koji Yamaki, Hadano (JP)

(73) Assignee: Topura Co., Ltd., Kanagawa (JP)

( * ) Notice: Subject to any disclaimer, the term of this patent is extended or adjusted under 35 U.S.C. 154(b) by 132 days.

(21) Appl. No.: 11/911,773

(22) PCT Filed: Jul. 21, 2005

(86) PCT No.: PCT/JP2005/013408

§ 371 (c)(1),
(2), (4) Date: Oct. 17, 2007

(87) PCT Pub. No.: WO2006/129382

PCT Pub. Date: Dec. 7, 2006

(65) Prior Publication Data

US 2009/0053008 A1   Feb. 26, 2009

(30) Foreign Application Priority Data

May 31, 2005  (JP)  ............................... 2005-159665

(51) Int. Cl.
*F16B 25/00*   (2006.01)

(52) U.S. Cl. .................. 411/386; 411/310; 411/311; 411/411; 411/416; 411/417; 411/387.8

(58) Field of Classification Search ................. 411/310, 411/311, 386–387.8, 411, 416, 417

See application file for complete search history.

(56) References Cited

U.S. PATENT DOCUMENTS 2,122,915 A * 7/1938 Olson .................... 411/386

(Continued)

FOREIGN PATENT DOCUMENTS

JP        39-14383        7/1964

(Continued)

OTHER PUBLICATIONS

Notification of Transmittal of Copies of Translation of the International Preliminary Report on patentability (Form PCT/IB/338) of International Application No. PCT/JP2005/013408 mailed Dec. 6, 2007.

(Continued)

*Primary Examiner*—Victor Batson
*Assistant Examiner*—Roberta Delisle
(74) *Attorney, Agent, or Firm*—Westerman, Hattori, Daniels & Adrian, LLP

(57) ABSTRACT

It is possible to prevent a screwing torque from becoming excessively high even when a screw is threadedly engaged into a deep guide hole. In a tapping screw 100 comprising a parallel screw 22, a taper thread 23 provided closer to a tip end of the tapping screw than the parallel screw 22, and a plurality of projections 30 which partially project along an apex and flanks on both sides of a screw thread and which form an internal thread on a surface of a guide hole formed in a to-be fastened member, the plurality of projections 30 are provided from a region where the taper thread 23 is provided to a portion of a region where the parallel screw 22 is provided, and a diameter of a virtual cylinder which comes into contact with tip ends of some of the projections 30 including a projection provided in a region where the parallel screw 22 is provided is larger than an outer diameter of a external thread of the parallel screw 22.

2 Claims, 7 Drawing Sheets

U.S. PATENT DOCUMENTS

| | | | | |
|---|---|---|---|---|
| 2,263,137 | A | * | 11/1941 | Oestereicher ............... 411/413 |
| 2,292,195 | A | * | 8/1942 | Brown ........................ 411/386 |
| 2,355,486 | A | * | 8/1944 | Tinnerman ................. 411/272 |
| 3,083,609 | A | * | 4/1963 | Lovisek ...................... 411/386 |
| 3,213,742 | A | * | 10/1965 | Kahn .......................... 411/416 |
| 3,286,579 | A | * | 11/1966 | Lovisek ...................... 411/411 |
| 3,338,117 | A | * | 8/1967 | De Vlieg et al. ............ 408/153 |
| 3,352,190 | A | * | 11/1967 | Carlson ...................... 411/403 |
| 3,489,195 | A | * | 1/1970 | Mortus ....................... 411/301 |
| 3,701,372 | A | * | 10/1972 | Breed ......................... 411/309 |
| 3,794,092 | A | * | 2/1974 | Carlson et al. .............. 411/310 |
| 3,831,213 | A | * | 8/1974 | Bedi ........................... 470/11 |
| 3,965,793 | A | * | 6/1976 | Roser ......................... 411/386 |
| 3,978,760 | A | * | 9/1976 | Muenchinger ............. 411/386 |
| 4,486,135 | A | * | 12/1984 | Kazino ....................... 411/411 |
| 4,637,767 | A | * | 1/1987 | Yaotani et al. .............. 411/411 |
| 4,789,288 | A | * | 12/1988 | Peterson .................... 411/386 |
| 4,958,972 | A | * | 9/1990 | Shinjo ..................... 411/387.1 |
| 5,133,630 | A | * | 7/1992 | Hughes ..................... 411/82.5 |
| RE34,969 | E | * | 6/1995 | Dixon et al. ................ 411/412 |
| 5,961,267 | A | * | 10/1999 | Goss et al. ................. 411/416 |
| 5,987,837 | A | * | 11/1999 | Nelson .................... 52/506.05 |
| 6,296,433 | B1 | * | 10/2001 | Forsell et al. ............... 411/386 |
| 6,447,227 | B1 | * | 9/2002 | Crutchley .................... 411/69 |
| 6,454,506 | B1 | * | 9/2002 | Keller et al. ............. 411/387.4 |
| 6,739,815 | B2 | * | 5/2004 | Takasaki .................. 411/387.1 |
| 6,910,841 | B2 | * | 6/2005 | Isenberg ..................... 411/386 |
| 7,021,877 | B2 | * | 4/2006 | Birkelbach et al. .......... 411/412 |
| 2001/0014262 | A1 | * | 8/2001 | Friederich et al. ........... 411/386 |
| 2003/0210970 | A1 | * | 11/2003 | Bechtel et al. ............. 411/411 |
| 2004/0101381 | A1 | * | 5/2004 | Kram et al. ................. 411/311 |

FOREIGN PATENT DOCUMENTS

| | | |
|---|---|---|
| JP | 56-39314 A | 4/1981 |
| JP | 62-55005 B2 | 11/1987 |
| JP | 8-1340 U | 9/1996 |
| JP | 8-226424 A | 9/1996 |
| JP | 8-338412 A | 12/1996 |
| JP | 2000-35016 A | 2/2000 |
| JP | 2001-200822 A | 7/2001 |

OTHER PUBLICATIONS

International Search Report of PCT/JP2005/013408, date of mailing Oct. 11, 2005.

Chinese Office Action dated Mar. 27, 2009 (mailing date), issued in corresponding Chinese Patent Application No. 2005800495304 (with partial English language translation).

* cited by examiner (A)  (B)

(A)

(B)

TAPPING SCREW

TECHNICAL FIELD

The present invention relates to a tapping screw.

BACKGROUND TECHNIQUE

There is a known tapping screw which is screwed into a guide hole formed in a to-be fastened member to form an internal thread on a surface of the guide hole by plastic deformation. As such a tapping screw, there is a known technique in which a projection for forming an internal thread on a region where a taper thread is provided, and an internal thread with which a parallel screw is threadedly engaged is formed in a surface of a guide hole by this projection (see patent documents 1 to 3). There is also known a technique in which a shank is provided at its tip end with a substantially cylindrical working screw thread having a diameter larger than that of a standard screw thread by an amount corresponding to a spring back (see patent document 4).

In such tapping screws, a external thread of the parallel screw (standard screw) is threadedly engaged with the internal thread formed by the projection during a screwing motion. Therefore, if the number of screw threads of the external thread which is screwed into the internal thread is increased, the frictional resistance is increased and thus, the screwing torque is increased in proportion to the screwing depth. Thus, when it is necessary to screw the external thread into a deep guide hole, the screwing torque becomes excessively high and the operability is deteriorated. With this, a sufficient axial force can not be obtained, and there is an adverse possibility that the fastened state becomes insufficient.

In the case of the conventional tapping screws, even if a bolt having the same nominal diameter as that of the internal thread formed by the tapping screw is screwed into the hole, since the inner diameter of the internal thread is small, the external thread and the internal thread interfere with each other. Thus, after a tapping screw which is once fastened is disengaged, if a general bolt is fastened to the internal thread formed by the tapping screw, a stable fastening axial force can not be obtained unlike general bolt and nut.

Patent document 1: Japanese Patent Publication No. S62-55005

Patent document 2: Japanese Patent Publication No. S39-14383

Patent document 3: Japanese Patent Application Laid-open No. H8-338412

Patent document 4: Japanese Patent Application Laid-open No. 2000-35016

DISCLOSURE OF THE INVENTION

Problem to be Solved by the Invention

It is an object of the invention to provide a tapping screw capable of preventing a screwing torque from being excessively increased even when the tapping screw is screwed into a deep guide hole.

Means for Solving the Problem

The present invention employs the following means to achieve the object.

That is, the invention provides a tapping screw comprising a parallel screw, a taper thread provided closer to a tip end of the tapping screw than the parallel screw, and a plurality of projections which partially project along an apex and flanks on both sides of a screw thread and which form an internal thread on a surface of a guide hole formed in a to-be fastened member, wherein the plurality of projections are provided from a region where the taper thread is provided to a portion of a region where the parallel screw is provided, and a diameter of a virtual cylinder which comes into contact with tip ends of some of the projections including a projection provided in a region where the parallel screw is provided is larger than an outer diameter of a external thread of the parallel screw.

According to the invention, the diameter of the virtual cylinder which comes into contact with tip ends of some of the projections including a projection provided in the region where the parallel screw is provided is larger than the outer diameter of the external thread of the parallel screw. Therefore, the inner diameter of the internal thread formed by the projections becomes larger than the outer diameter of the external thread of the parallel screw. Therefore, in the course of the screwing motion of the internal thread (before axial force is generated), the parallel screw does not abut against the internal thread. Thus, in the course of the screwing motion, the parallel screw does not increase the screwing torque. Since the inner diameter of the internal thread is larger than the outer diameter of the external thread of the parallel screw, it is possible to prevent a screw thread of a general bolt and the screw thread of the formed internal thread from interfering with each other even if the general bolt is fastened after the tapping screw is disengaged.

It is preferable that the tip ends of all of the projections are arranged on a virtual spiral whose diameter is gradually increased from a tip end of a shank toward a head.

With this, the internal thread can be formed smoothly until the internal thread is formed into its final shape.

It is also preferable that an axis of the virtual cylinder which comes into contact with the tip ends of the plurality of projections provided in the region where the parallel screw is provided matches with an axis of a shank.

EFFECT OF THE INVENTION

As explained above, according to the invention, it is possible to provide a tapping screw capable of preventing a screwing torque from being excessively increased even when the tapping screw is screwed into a deep guide hole.

With this, it is possible to enhance the fastening operation. It is possible to realize a stable fastening state. Further, since the inner diameter of the internal thread is larger than the outer diameter of the external thread of the parallel screw, it is possible to prevent the screw thread of the general bolt and the screw thread of the formed internal thread from interfering with each other even when the general bolt is fastened after the tapping screw is disengaged.

Figure 1:
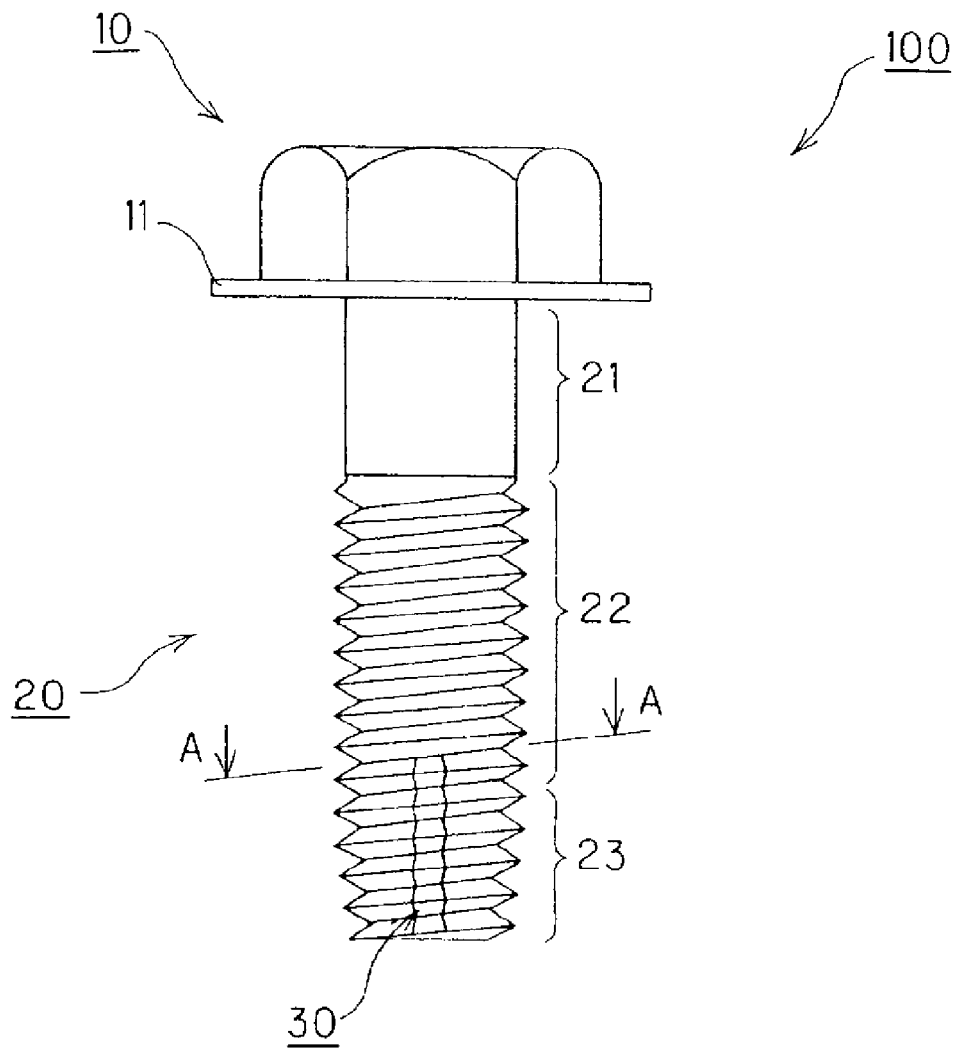
FIG. 1 is a front view of a tapping screw of an embodiment 1 of the present invention.

DESCRIPTION OF REFERENCE NUMERALS 10 head
11 flange
20 shank
21 cylindrical portion
22 parallel screw
23 taper thread
30, 31, 32, 33 projection
40, 41, 42, 43 projection
100, 200 tapping screw
500 first member
501 guide hole
600 second member
601 through hole

BEST MODE FOR CARRYING OUT THE INVENTION

The best mode for carrying out the invention will be explained in detail based on embodiments with reference to the drawings. The scopes of the invention are not limited to size, material, shape, relative disposition and the like of constituent parts described in the embodiments unless otherwise specified.

Embodiment 1

Figure 2:
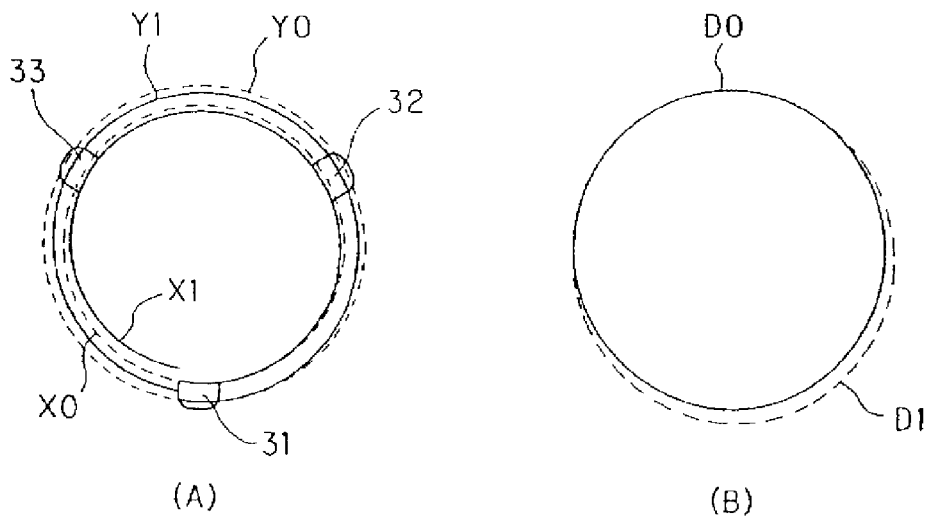
FIG. 2 are explanatory diagrams showing a positional relation between a screw thread and a projection of the tapping screw of the embodiment 1 of the invention.
Figure 3:
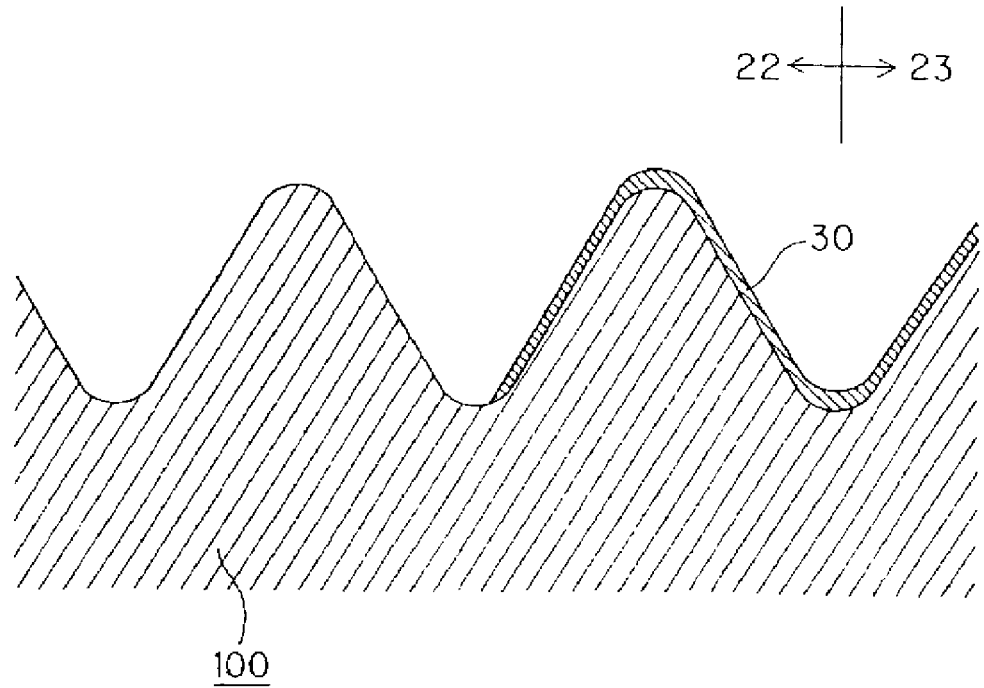
FIG. 3 is a schematic sectional view of a portion of the tapping screw of the embodiment 1 of the invention where a projection for forming an internal thread is provided.
Figure 4:
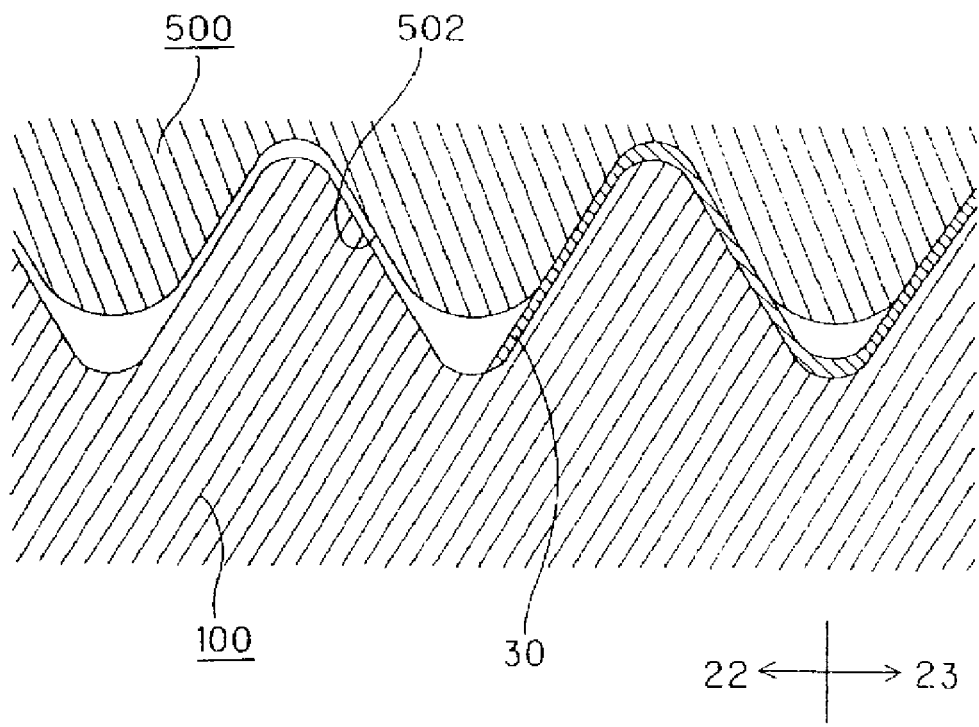
FIG. 4 is a schematic sectional view of a portion of the tapping screw of the embodiment 1 of the invention where a projection for forming the internal thread at the time of fastening operation is provided.
Figure 5:
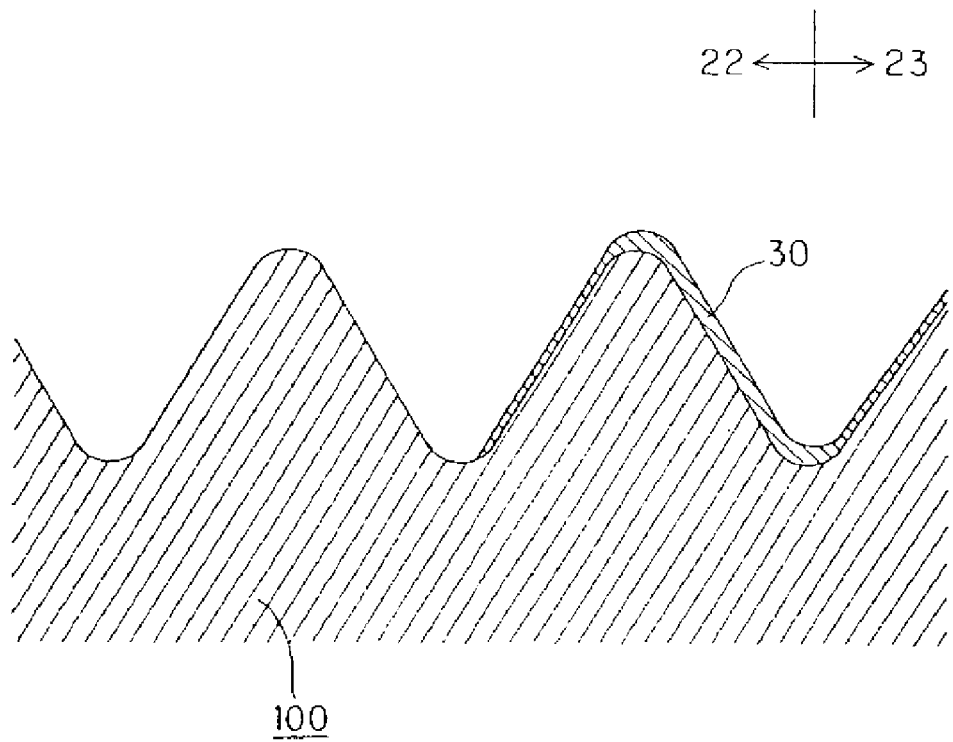
FIG. 5 is a schematic sectional view of a portion of the tapping screw of the embodiment 1 of the invention where a projection for forming an internal thread is provided.
Figure 6:
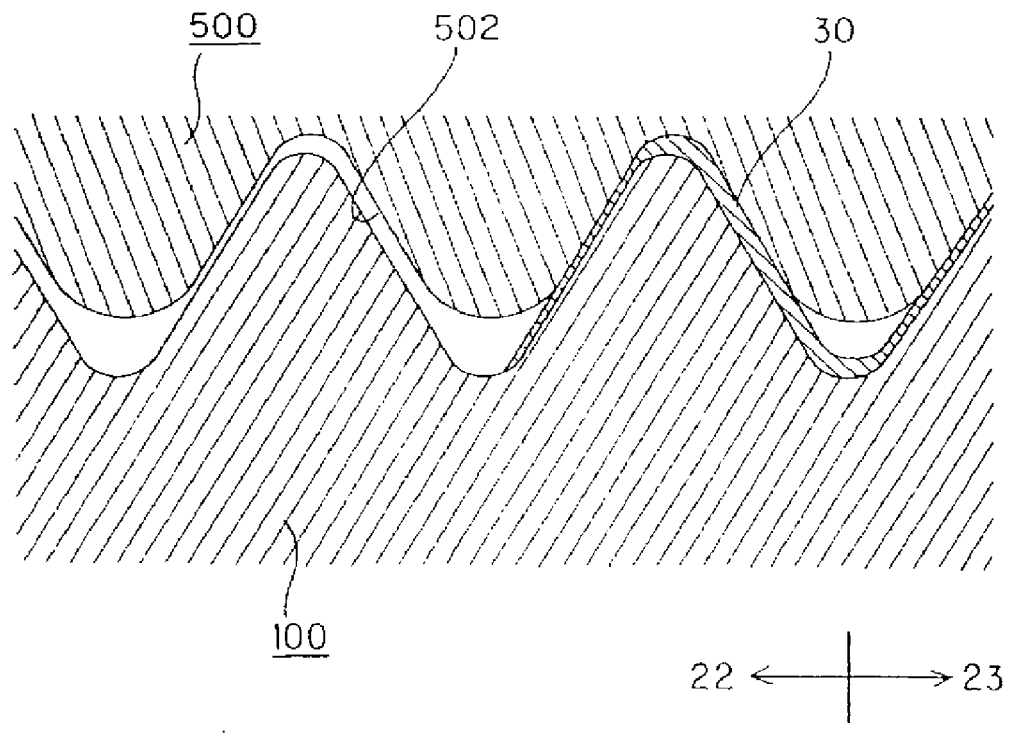
FIG. 6 is a schematic sectional view of a portion of the tapping screw of the embodiment 1 of the invention where a projection for forming the internal thread at the time of fastening operation is provided.
Figure 7:
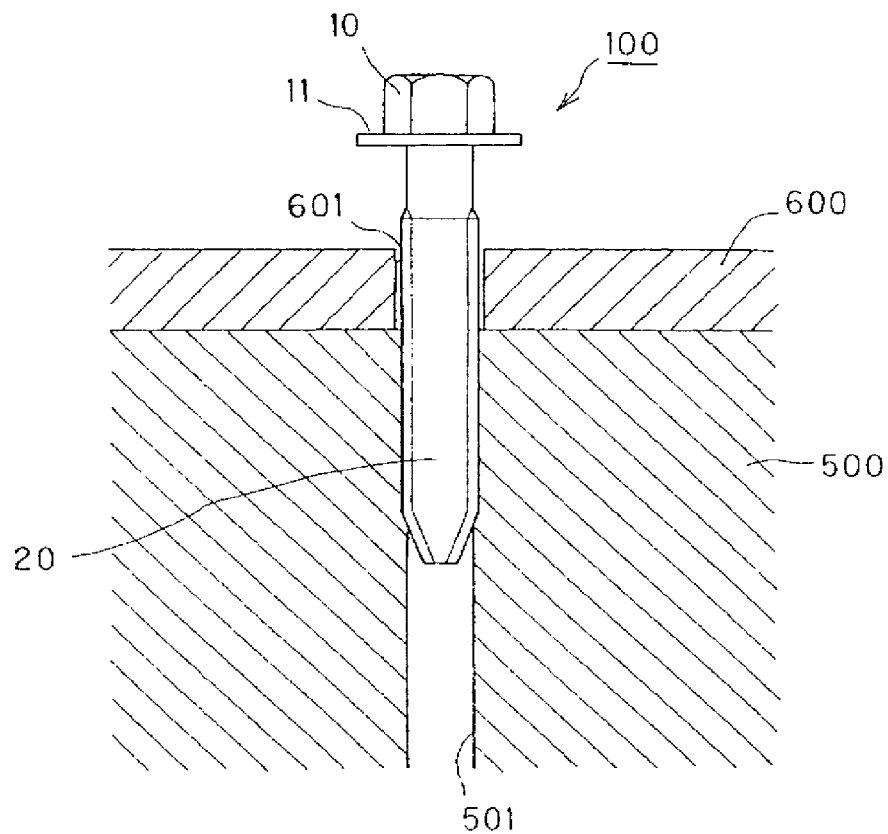
FIG. 7 is a schematic diagram showing a state where the tapping screw of the embodiment 1 of the invention is being screwed.
Figure 8:
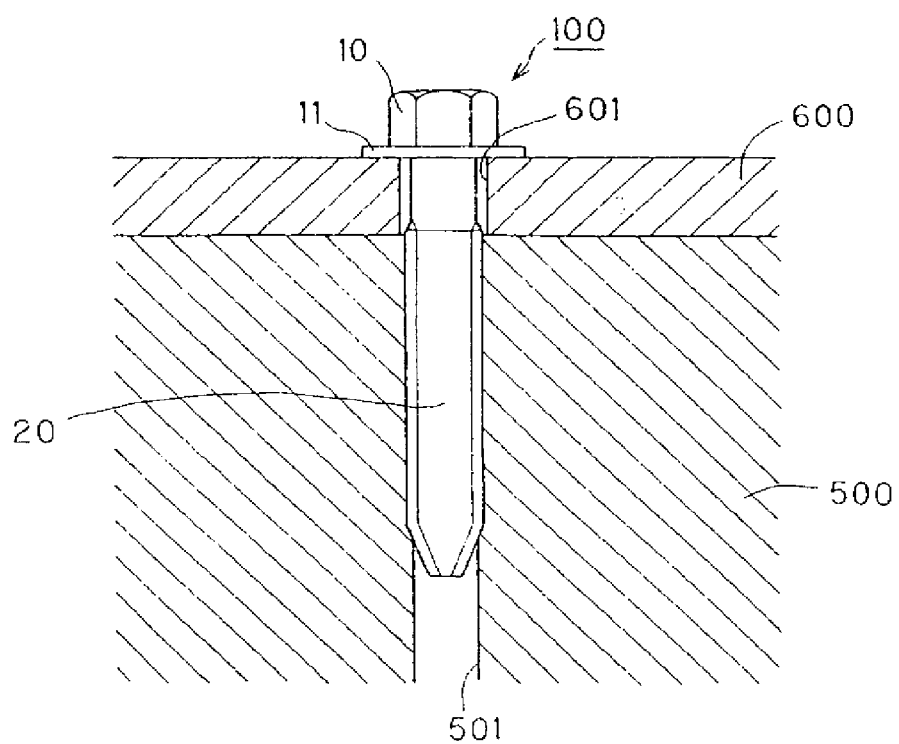
FIG. 8 is a schematic diagram of a state where the tapping screw of the embodiment 1 of the invention is fastened.
Figure 9:
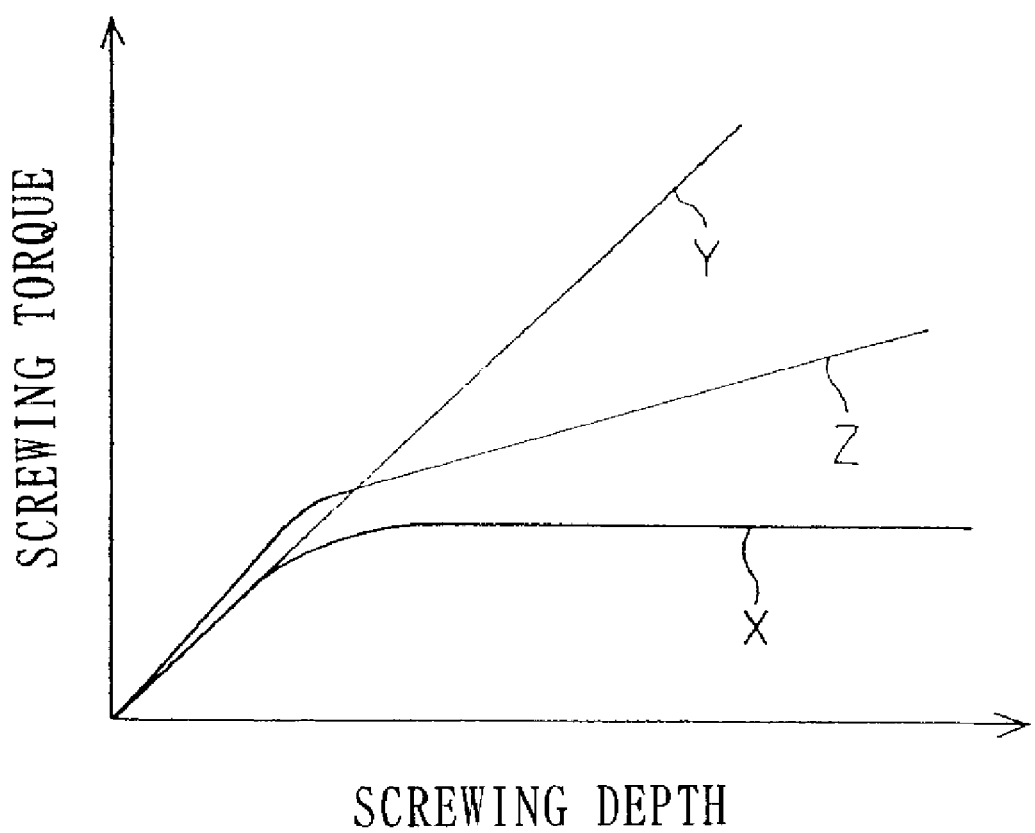
FIG. 9 is a graph showing screwing characteristics.

A tapping screw of an embodiment 1 of the present invention will be explained with reference to FIGS. 1 to 9. FIG. 1 is a front view of a tapping screw of an embodiment 1 of the present invention. FIG. 2 are explanatory diagrams showing a positional relation between a screw thread and a projection of the tapping screw of the embodiment 1 of the invention. FIGS. 3 and 5 are schematic sectional views of a portion of the tapping screw of the embodiment 1 of the invention where a projection for forming an internal thread is provided (sectional views taken along an axis of a shank). FIGS. 4 and 6 are schematic sectional views of a portion of the tapping screw of the embodiment 1 of the invention where a projection for forming the internal thread at the time of fastening operation is provided (sectional views taken along the axis of the shank). FIG. 7 is a schematic diagram showing a state where the tapping screw of the embodiment 1 of the invention is being screwed. FIG. 8 is a schematic diagram of a state where the tapping screw of the embodiment 1 of the invention is fastened. FIG. 9 is a graph showing screwing characteristics.

<Outline Structure of Tapping Screw>

The outline structure of the tapping screw will be explained especially with reference to FIG. 1. The tapping screw 100 of the embodiment includes a head 10 having a flange 11, and a shank 20. The shank 20 includes a cylindrical portion 21, a parallel screw 22 and a taper thread 23 from the side of the head 10 toward a tip end of the tapping screw 100 in this order. The shank 20 is provided with a plurality of projections 30 for forming an internal thread on a surface of a guide hole provided in a to-be fastened member.

In this embodiment, the plurality of projections 30 are provided from a region of the tapping screw where the taper thread 23 is provided to a portion of a region of the tapping screw where the parallel screw 22 is provided. More specifically, the projections 30 are continuously provided from a portion of the tapping screw near a tip end of the taper thread 23 to a first screw thread of the parallel screw 22 spirally every 120°.

<Detailed Explanation of the Projections>

The projections 30 will be explained in detail especially with reference to FIGS. 2 to 6. FIG. 2A is a traverse sectional view spirally taken along the line A-A in FIG. 1 starting from a projection 31 closest to the head. FIG. 2B shows a relation between an outer diameter D0 of a external thread of the parallel screw 22 and a diameter D1 of a virtual cylinder (an axis of the cylinder is in parallel to the axis of the shank 20) which comes into contact with tip ends of three projections 30 selected from those located closest to the head 10 (to make it easy to understand, these three projections are called projections 31, 32 and 33). In FIG. 2A, symbols X0 and X1 represent valley bottoms of the screw thread, and Y0 and Y1 represent apexes of the screw thread. Dotted X0 and Y0 respectively represent the valley bottom and the apex of the screw thread in the parallel screw 22.

As shown in FIGS. 3 to 6, the projections 30 are provided such as to partially project along the apex and flanks (leading side flank and following side flank) of both sides of the screw thread. Concerning the shape of the projection 30, the projection 30 may have uniform thickness with respect to the both side flanks as shown in FIGS. 3 and 4, or the leading side flank which receives greater pressure by force added by the thrust when screwing may be thicker than the following side flank as shown in FIGS. 5 and 6.

In this embodiment, the projecting height (thickness) from the surface of the screw thread is equal in all projections 30. In this embodiment, only the projection 31 closest to the head 10 is provided in the region where the parallel screw 22 is provided. With this, if all of tip ends of the projections 30 are connected from the projection closest to the tip end in this order, a spiral shape whose diameter is gradually increased from the tip end toward the head 10 can be formed. The diameter D1 of the virtual cylinder (the axis of the cylinder is in parallel to the axis of the shank 20) which comes into contact with tip ends of the three projections 31 to 33 on the side of the head 10 is larger than an outer diameter D0 of the external thread of the parallel screw 22 (see FIG. 2).

<Concerning the Screwing Motion>

The screwing motion of the tapping screw 100 having the above-described structure will be explained especially with reference to FIGS. 3 to 8. As shown in FIG. 7, the tapping screw 100 is screwed in a state where a guide hole 501 provided on a first member 500 which becomes the to-be fastened member and a through hole 601 formed in a second member 600 fixed to the first member 500 are aligned with each other. With this, the tapping screw 100 is screwed while forming the internal thread 502 on the surface of the guide hole 501 provided in the first member 500 by plastic deformation. FIG. 8 shows a state where the screwing motion is completed. In this embodiment, the first member 500 is made of soft material such as light alloy and light metal, and the deep guide hole 501 is formed in the first member 500. Generally, the tapping screw is screwed into a guide hole formed in a thin plate, and a tip end of the screw projects from the plate, but in the case of this embodiment, the tapping screw is screwed into the deep guide hole 501, and the tip end of the screw is embedded in the guide hole 501 as shown in the drawing.

In this embodiment, as described above, the diameter D1 of the virtual cylinder which comes into contact with the tip ends of the three projections 31 to 33 on the side of the head 10 is larger than the outer diameter D0 of the external thread of the parallel screw 22. Therefore, the valley of the internal thread 502 formed on the surface of the guide hole 501 by the plurality of projections 30 is larger than a mountain of the external thread of the parallel screw 22 (the inner diameter of the internal thread 502 is larger than the outer diameter of the external thread of the parallel screw 22).

Therefore, in the course of screwing motion (before axial force is generated), the parallel screw 22 does not abut against the internal thread 502 (see FIGS. 4 and 6). After the flange 11 of the head 10 abuts against the second member 600 and a tensile force is applied to the shank 20 and an axial force greater than a given value is generated, the parallel screw 22 and the internal thread 502 come into contact with each other. With this, after the axial force greater than the given value is generated, a sufficient fastening force can be obtained as in the relation between general bolt and nut.

<Excellent Points of the Tapping Screw of the Embodiment>

According to the tapping screw 100 of the embodiment, in the course of screwing motion, the parallel screw 22 does not abut against the internal thread 502. For this reason, in the course of the screwing motion, the parallel screw 22 is not involved in the screwing torque. Thus, the screwing torque after the forming operation of the internal thread is started by the projection 31 closest to the head 10 can be made uniform. Therefore, the conventional phenomenon that the screwing torque is increased in proportion to the screwing depth can be suppressed.

FIG. 9 is a graph showing the screwing characteristics. The horizontal axis shows the screwing depth and the vertical axis shows the screwing torque. In the drawing, a symbol X shows a case of the tapping screw of the embodiment, a symbol Y shows a case of a tapping screw provided with projections for forming an internal thread only on a taper thread as in the patent documents 1 to 3, and a symbol Z shows a case in which a substantially cylindrical working screw thread is provided on a tip end side as compared with a standard screw thread as in the patent document 4.

As can be found in this graph, in the case of the tapping screw of the embodiment, if the screwing depth exceeds a predetermined amount, the screwing torque becomes constant. In the case of the conventional example Y formed such that the external thread is threadedly engaged with the internal thread, the screwing torque is increased in proportion to the screwing depth even if the screwing depth exceeds the predetermined amount. In this embodiment, the screw thread is gradually formed. In the case of the conventional example Z, since the maximum diameter of a working screw portion starts from its tip end, the screwing torque is abruptly increased. Since the contact area of the working screw portion is large, the screwing torque becomes high, the tip end can not capture a center of the guide hole and thus, the axis is prone to be deviated, and as the screwing depth is increased, the screwing torque is increased.

From the above reason, according to the tapping screw of the embodiment, it is possible to prevent the screwing torque from being excessively increased even when the guide hole is deep. With this, it is possible to enhance the fastening operation. It is possible to manage the fastened state in conformance with fastening management of general bolt and nut, and to realize a fastened state which generates a stable axial force. The valley of the internal thread formed by the tapping screw 100 of the embodiment is larger than the external thread of the parallel screw 22. Therefore, it is possible to fasten a general bolt having the same nominal diameter as that of the internal thread to the internal thread after the tapping screw 100 is detached like a normal nut. In this case, it is possible to fasten the same fastened state as that of the general bolt and nut, and to obtain the stable fastening force.

Embodiment 2

Figure 10:
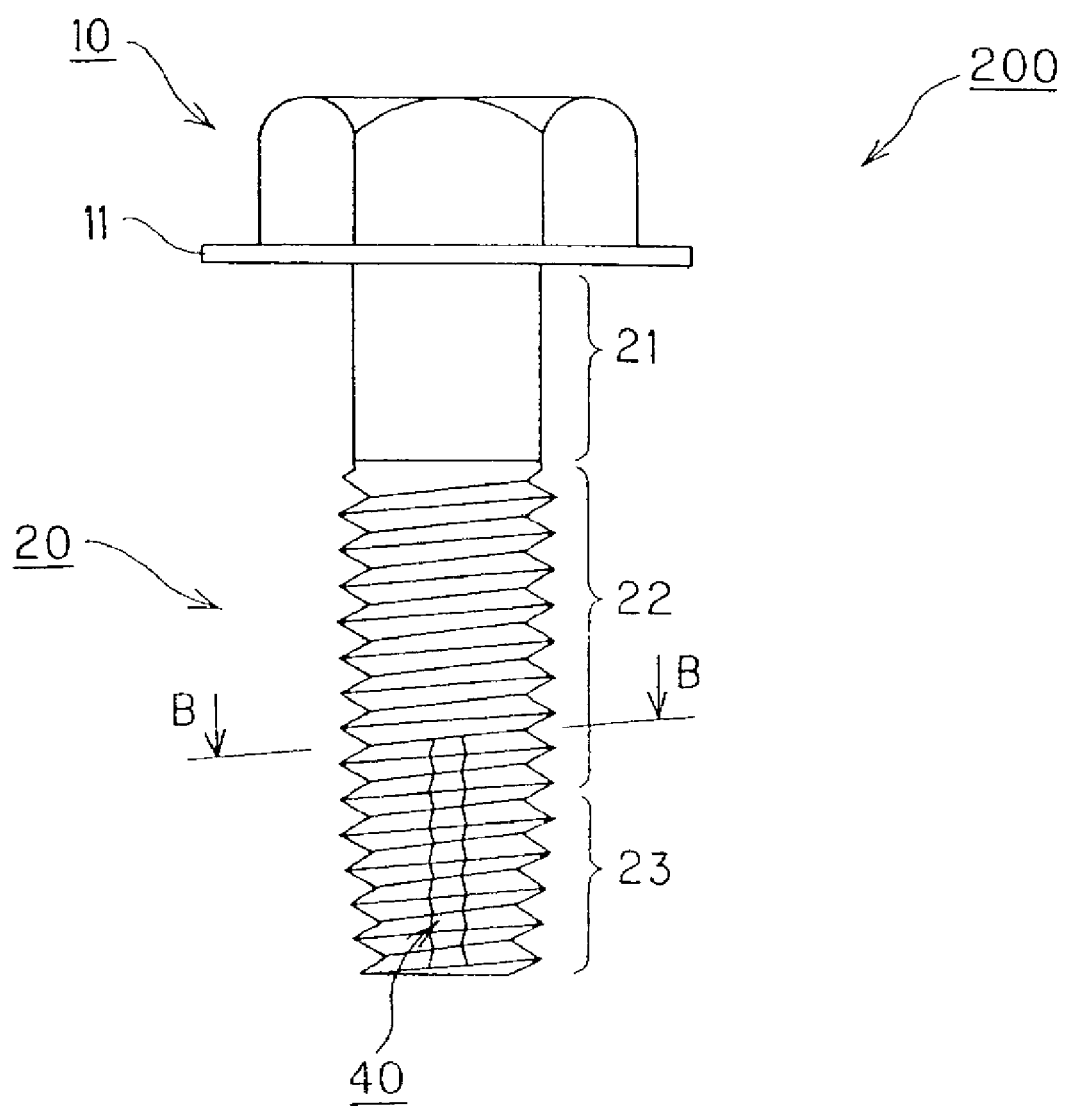
FIG. 10 is a front view of a tapping screw according to an embodiment 2 of the invention.
Figure 11:
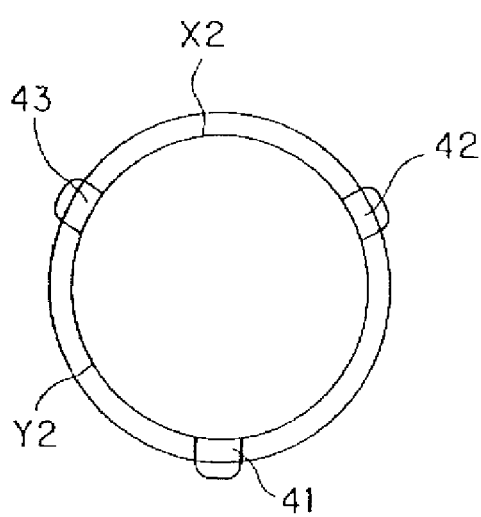
FIG. 11 are explanatory diagrams showing a positional relation between a screw thread and a projection of the tapping screw of the embodiment 2 of the invention.
Figure 11:
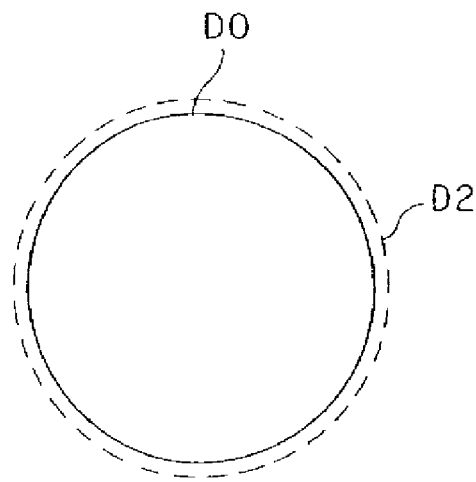

FIGS. 10 and 11 show an embodiment 2 of the present invention. In this embodiment, the working projections are provided up to the second screw threads of the parallel screw as compared with the structure of the embodiment 1. Since other structure and function are the same as those of the embodiment 1, the same constituent portions are designated with the same symbols, and explanation thereof will be omitted.

FIG. 10 is a front view of a tapping screw according to the embodiment 2 of the invention. FIG. 11 are explanatory diagrams showing a positional relation between a screw thread and a projection of the tapping screw of the embodiment 2 of the invention.

The tapping screw 200 of this embodiment has basically the same structure as that of the tapping screw 100 of the embodiment 1, but in the case of the embodiment 2, the number of plurality of projections 40 for forming the internal thread on the surface of the guide hole provided in the to-be fastened member is higher than that of the embodiment 1. The projections will be explained with reference to FIG. 11.

FIG. 11A is a transverse sectional view spirally taken along the line B-B in FIG. 10 starting from a projection 41 closest to the head. FIG. 11B is a relation between an outer diameter D0 of the external thread of the parallel screw 22 and a diameter D2 of a virtual cylinder (an axis of this cylinder is in parallel to the axis of the shank 20) which comes into contact with tip ends of three projections 40 selected from those located closest to the head 10 (to make it easy to understand, these three projections are called projections 41, 42 and 43). In FIG. 11A, symbol X2 represents a valley bottom of the screw thread, and Y2 represents an apex of the screw thread.

The projection 40 of the embodiment 2 has the same structure as that of the projection 30 of the tapping screw 100 of the embodiment 1 except the projections 41, 42 and 43 on the side of the head 10.

In the case of the embodiment 2, all of the projections 41, 42 and 43 are provided in a region where the parallel screw 22 is provided. Therefore, the axis of the virtual cylinder which comes into contact with the tip ends of the projections 41, 42 and 43 matches with the axis of the shank 20. Further, the diameter D2 of the virtual cylinder which comes into contact with the tip ends of the projections 41, 42 and 43 becomes larger than the diameter D1 in the embodiment 1.

In the case of the tapping screw 200 of this embodiment 2 also, the same effect as that of the tapping screw 100 of the embodiment 1 can be obtained. In the embodiment 2, since the diameter D2 of the virtual cylinder which comes into contact with the tip ends of the projections 41, 42 and 43 is larger than that of the embodiment 1, the valley of the internal thread formed by the tapping screw 200 of the embodiment 2 is larger than that of the embodiment 1. With this, in the course of the screwing motion, the outer diameter of the internal thread formed by the parallel screw 22 becomes large, and even when the thread outer diameter of a general bolt is increased, it is possible to provide a external thread which is fastened to the formed internal thread with a constant clearance.

According to the embodiment, since the axis of the virtual cylinder which comes into contact with the tip ends of the projections 41, 42 and 43 matches the axis of the shank 20, the concentric degree with respect to the internal thread when the tapping screw 200 is fastened can further be enhanced.

(Others)

Although the projection is provided every 120° (i.e., three projections in one circle) in the above embodiments, the disposition and the number of projections are not limited to those of the embodiments of course.

The invention claimed is:

1. A tapping screw comprising:
a parallel screw;
a taper thread provided closer to a tip end of the tapping screw than the parallel screw; and
a plurality of projections which partially project along an apex and flanks on both sides of a screw thread and which form an internal thread on a surface of a guide hole formed in a to-be fastened member, wherein
the plurality of projections are provided from a region where the taper thread is provided to a portion of a region where the parallel screw is provided, and
tip ends of the projections in the taper threaded region extend beyond tip ends of the screw threads in the parallel screw region in a radial direction with respect to a virtual cylinder formed by the screw;
wherein a leading side of the flanks of the projections are thicker than the trailing side of said flanks of the projections.

2. A tapping bolt comprising:
a parallel thread section;
a flange located at a head of the bold and attached to a shank of the bolt;
a taper thread provided closer to a tip end of the bolt than the parallel section of the bolt; and
a plurality of projections which partially project along an apex and flanks on both sides of a bolt thread and which form an internal thread on a surface of a guide hole formed in a to-be fastened member, wherein
the plurality of projections are provided from a region where the taper thread is provided to a portion of a region where the parallel thread section is provided, and
tip ends of the projections in the taper threaded region extend beyond tip ends of the screw threads in the parallel screw region in a radial direction with respect to a virtual cylinder formed by the screw;
wherein a leading side of the flanks of the projections are thicker than the trailing side of said flanks of the projections.

* * * * *